(12) United States Patent
Adolphson et al.

(10) Patent No.: US 12,111,748 B2
(45) Date of Patent: Oct. 8, 2024

(54) AUTOMATED MULTI-TIER DEBUG INFORMATION COLLECTION

(71) Applicant: BBY SOLUTIONS, INC., Richfield, MN (US)

(72) Inventors: David Adolphson, Apple Valley, MN (US); Praveen Kotla, Apple Valley, MN (US)

(73) Assignee: BBY SOLUTIONS, INC., Richfield, MN (US)

(*) Notice: Subject to any disclaimer, the term of this patent is extended or adjusted under 35 U.S.C. 154(b) by 317 days.

(21) Appl. No.: 17/590,755

(22) Filed: Feb. 1, 2022

(65) Prior Publication Data

US 2023/0281105 A1    Sep. 7, 2023

(51) Int. Cl.
 *G06F 11/36* (2006.01)
(52) U.S. Cl.
 CPC .................. *G06F 11/362* (2013.01)
(58) Field of Classification Search
 CPC .................................................. G06F 11/362
 See application file for complete search history.

(56) References Cited

U.S. PATENT DOCUMENTS 7,669,186 B2 * 2/2010 Nolan ................ G06F 11/362
                                                717/124
8,892,955 B1 * 11/2014 Shillington .......... G06F 11/362
                                                717/124

OTHER PUBLICATIONS

"How to Implement and Interpret Debug Headers", [online]. Retrieved from the Internet: <URL: https://www.section.io/blog/debug-headers-best-practices/>, (Jan. 29, 2019), 11 pgs.
Graham-Cumming, John, et al., "Tools for debugging, testing and using HTTP/2", © Cloudflare [online]. Retrieved from the Internet: <URL: https://blog.cloudflare.com/tools-for-debugging-testing-and-using-http-2/>, (Dec. 4, 2015), 17 pgs.
Jayaprakash, Akhil, et al., "Introducing the ESI Debugger API and a New Debugger UI", [online]. Retrieved from the Internet: <URL: https://developer.akamai.com/blog/2018/09/11/introducing-esi-debugger-api-and-new-debugger-ui>, (Sep. 11, 2018), 6 pgs.
Serrano, Manuel, et al., "A Multitier Debugger for Web Applications", WEBIST 2014—International Conference on Web Information Systems and Technologies, (2014), 12 pgs.

* cited by examiner

*Primary Examiner* — Nadeem Iqbal
(74) *Attorney, Agent, or Firm* — Schwegman, Lundberg & Woessner, P.A.

(57) ABSTRACT

Systems and techniques for automated multi-tier debug information collection are described herein. A request may be received to debug a web page from a client computing device. An origin response may be obtained for the request from a content server. Child fragment calls may be identified that are in a downstream tier using the origin response. Debugging information may be extracted from the child fragment calls. The debugging information may be aggregated from the child fragment calls. The aggregated debugging information may be parsed for output on a display device.

27 Claims, 9 Drawing Sheets

```
▼[
  ▼"debugStart": {
      "type": "start",
      "id": "958750e6-abc0-4259-baae-6e5a64d57147",
      "serviceUrl": "[https://downstream1.url.com?foo=bar, https://downstream2.url.com?bar=bazz, https://downstreamn.url.com?abc=xyyz]",
      "responseUrlHeaders": {}
  },
  ▼"cchpInfo": {
      "cacheStatus" : "STALE",
      "downstreamRemainingTtl" : "1234",
      "downstreamEnableRespectCacheControlHeader" : "false",
      "cdnTtl" : "1234",
      "cdnMin" : "1234",
      "cdnMax" : "1234",
      "cdnDefaultTtl" : "1234",
      "l2TtlDefaultFresh" : "1234",
      "l2TtlDefaultStale" : "1234",
      "l2TtlDefaultRatio" : "50%",
      "l2TtlMin" : "1234",
      "l2TtlMax" : "1234",
      "l2TtlDefaultTotalExpiration" : "1234",
      "l2TtlCacheTimeMultiplier" : "1234",
      "UpstreamCacheControlHeader" : "XXXX"
  },
  ▲"debugEnd": {
      "type": "end",
      "id": "958750e6-abc0-4259-baae-6e5a64d57147"
  }
▲]
```

AUTOMATED MULTI-TIER DEBUG INFORMATION COLLECTION

TECHNICAL FIELD

Embodiments described herein generally relate to web site debugging and, in some embodiments, more specifically to automated multi-tier debug information collection.

BACKGROUND

In the context of large and complex web sites (e.g., eCommerce sites, etc.), several tiers of systems contribute to serving pages on the site. Each system may focus on a specific domain (e.g., pricing, searching, fulfillment, etc.) and a specific function (e.g., rendering views, providing data via application programming interfaces (APIs), executing business processes, etc.). It may be desired to be able to quickly and easy debug each micro detail of the web page or an API response served to the client device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The systems and techniques discussed herein enable quick and easy debugging of each micro detail of a web page or an application programming interface (API) response served to a client device. The systems and techniques discussed herein enable visibility into responses served from each system, request/response headers used, cache state of data served from each layer of an application, edge-side include (ESI) instructions provided to a content delivery network (CDN), page size served, other custom debugging information that may be added at each system level, etc.

The systems and techniques use a set of systems and library functions that work together to collect the debugging information from all the systems involved in constructing and serving web pages or API responses. For a complex large web site implemented using an N-tier architecture involving multiple services and systems, a software library enables collecting a variety of debugging information including, by way of example and not limitation, capturing request/response headers, response times, response page size, ESI-instructions for CDN enabled systems, cache times for the systems involved in caching the data, etc. The N-tier architecture may include a variety of computing tiers including content delivery networks, application tiers, API service tiers, etc., that are responsible for delivering a fully rendered web page to the client device. A set of libraries are used for front-end applications to present the debugging information in an interactive interface to an end-user client in a rich format.

Conventional debugging techniques may collect debugging information individually for systems that deliver a web site and may require manual and time-consuming processes to debug the systems throughout the delivery path. Conventional debugging approaches may use logging tools and a user may have to access to the systems intended for debugging. The user may need help from teams that own applications at various tiers to enable knowledge transfer and to understand problems indicated by logging data. The user may have to use the same tedious and time-consuming process over again to debug in different environments such as a test environment, a stagging environment, and a development environment. The user may have to gather and document the analysis to demonstrate the problem to others. Furthermore, there may be different approaches across teams and companies.

In contrast to conventional debugging techniques, the systems and techniques discussed herein enable the user to view the debugging information in a single user interface that may be graphically presentable. The user does not need to have access to the systems of an N-tier architecture intended for debugging, enabling easy integration and continuing to collect debugging information when new systems are added or existing are systems removed from the N-tier architecture without reconfiguration.

In an example, the systems and techniques discussed herein use a snoop RESTful service endpoint variant at each application and service level for each regular endpoint. The snoop endpoint collects the debugging information such as, for example, the ESI instructions for CDN of the public or child fragment URLs, downstream calls made during the complete request processing, the cache states of the downstream data served, request and response header information, etc. Client side components are used to parse the ESI instructions to identify subsequent child fragments to be called for recursive debugging. In an example, a header (e.g., pragma: x-enable-debug-mode) may be added and used to enable debugging information to be captured on a request to an original (e.g., normal) endpoint. The functionality of the header is similar to the snoop endpoint but the debugging information is added to the original client response.

The systems and techniques discussed herein may be pluggable with (e.g., interfaced directly with, called via API, etc.) a variety of presentation web frameworks to display the debugging information in a single interface. The tool that provides the streamlined collection of debugging information in a central interface may be used by many departments across an organization to triage problems that may occur at a CDN level, application caching level, downstream level, etc. Metrics may be calculated to supplement the raw debugging information including, by way of example and not limitation, a page/fragment size, a total number of ESI fragments on the page, total cache times at the CDN and application caching level, etc.

The systems and techniques discussed herein enable increased efficiency for debugging ESI instructions served to a CDN enabling an understanding of data and fragments on the web page. Visibility into debug information like downstream calls and HTTP response status (e.g., 2XX/3XX/4XX/5XX responses) and a state of data served at each layer (e.g., fresh, stale, expired, etc.) enables understanding of caching behavior. Various caching debugging information is provided such as what URLs/tags may be flushed, etc. Enhanced debugging information may be derived from raw debug data by calculating a whole page size and dividing weights by fragment level, calculating total number of fragments on the page, and providing information about cache times (e.g., max-age, etc.) at a CDN and a distributed memory-caching system level. The systems and techniques discussed herein may integrate with client-side tools like plugins or simple applications which may present the debugging information provided in a rich presentable format in a central dashboard or other user interface.

Figure 1:
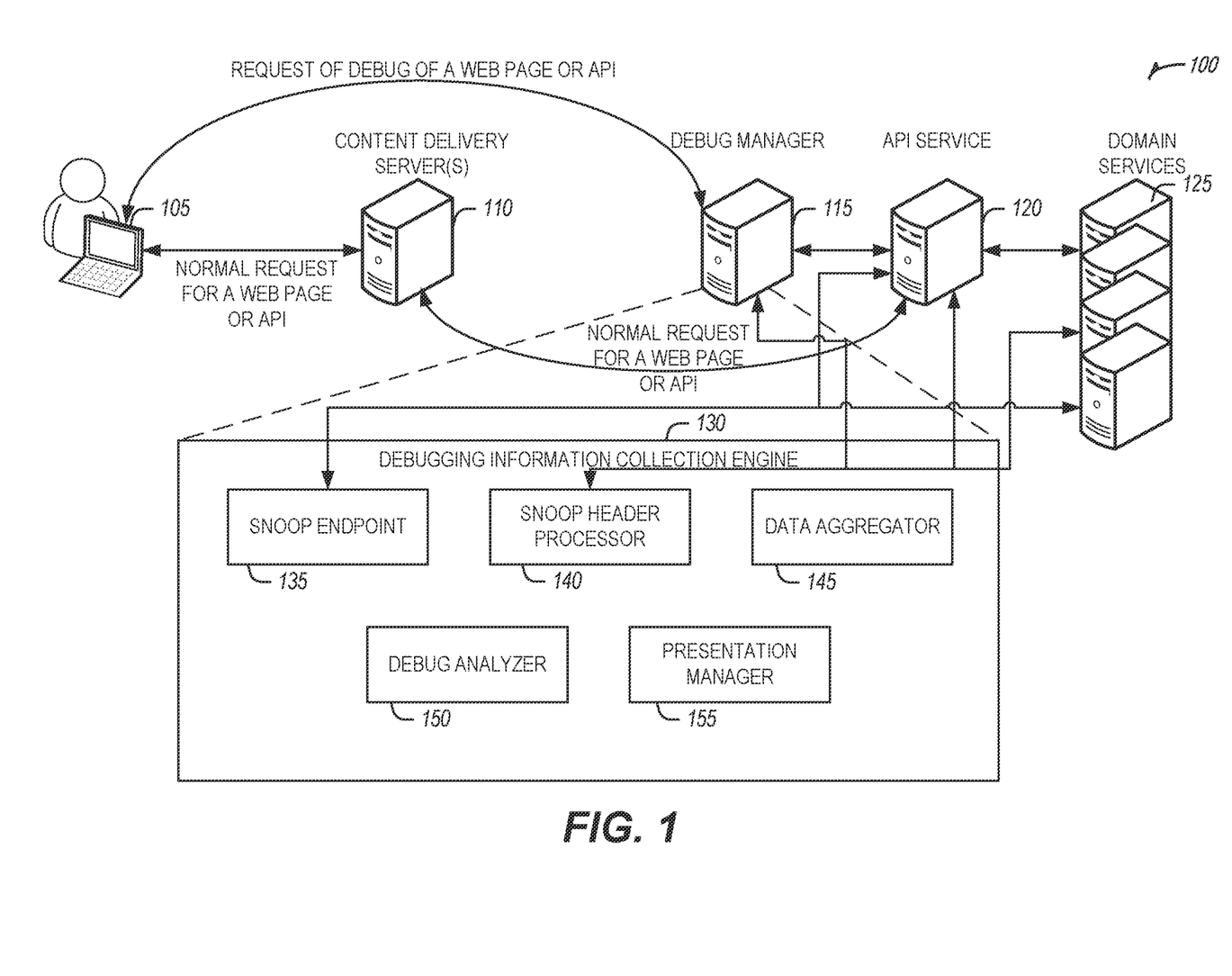
FIG. 1 is a block diagram of an example of an environment and a system for automated multi-tier debug information collection, according to an embodiment.

FIG. 1 is a block diagram of an example of an environment 100 and a system 130 for automated multi-tier debug information collection, according to an embodiment. The environment 100 may include a multi-tiered web page delivery architecture that includes a variety of tiers including a client tier 105, a CDN tier 110, an API service tier 120, and a variety of domain service tiers 125. Each tier may provide a function or service for delivering web site pages or debug results of web site pages to the client tier 105.

A debug manager 115 may be executing the system 130. In an example, the system may be a debugging information collection engine. The debug manager 115 may be a computing device (e.g., a stand alone server, a cloud computing system, a cluster of service computing devices, etc.), may be a service running on a field programmable gate array (FPGA), an application specific integrated circuit (ASIC), or may be software executing on one or more computing devices operating within one or more of the tiers of the web page delivery architecture.

The system 130 may include a variety of components including a snoop endpoint 135, a snoop header processor 140, a data aggregator 145, a debug analyzer 150, and a presentation manager 155. The components of the system 130 may be executing on a single computing device or may be executing on multiple computing devices in whole or with components distributed among a variety of computing devices. A request may be received for a web page from a client computing device. For example, a user in the client tier 105 may request a web page from a website served by the multi-tier web page delivery architecture.

An origin response may be obtained by the debug analyzer 150 for the request rather than a content server such as a CDN server from the CDN tier 110, etc. In an example, the origin response may include a universal resource locator (URL) or a similar universal resource identifier (URI) for the web page for a web server. For example, the origin response may include identification of servers, applications, services, etc. that provided fragments or components of the web page content.

The snoop endpoint 135 may include libraries that include instructions and configurations for collecting debug information for systems and services operating within the multi-tiered web page delivery architecture such as between the client tier 105, the API service tier 120, and the domain tiers 125. For example, the libraries may include instructions for collecting ESI instruction data from web page requests from a client device in the client tier 105. The data may be delivered using APIs from the API service tier 120 to generate page fragments using the domain servers in the domain tiers 125. The page fragments may be delivered by a CDN server in the CDN tier 110.

The snoop header processor 140 may modify headers of web page requests to include snoop instructions for collecting debug information across the various tiers (e.g., between the client tier 105 and the debug manager 115, the API service 120, and the domain services 125, etc.) of the multi-tier web page delivery architecture. The debug data collected from the snoop endpoint 135 and the headers injected by the snoop header processor 140 may be aggregated by the data aggregator 145. The data aggregator 145 may manage organization and storage of the debug information. In an example, the data aggregator 145 may arrange debug information based on the sequence of flow of a request from a client device to the back-end services and services responsible for compiling and delivering a response to the client device. In another example, the data aggregator 145 may arrange debug information by function, computing tier, or in other arrangements that may be enable simplified presentation of the debug information by the presentation manager 155.

Figure 4:
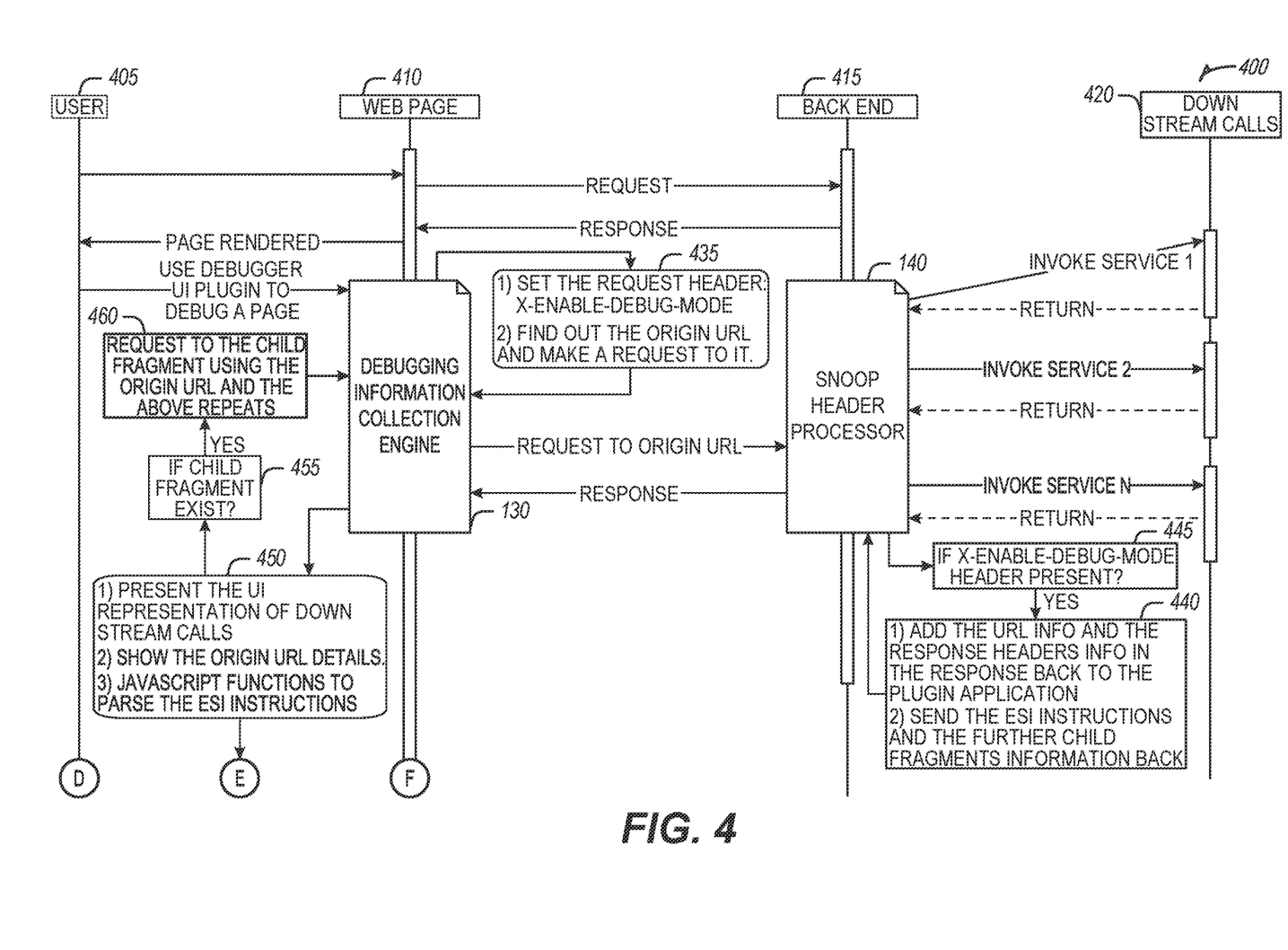
FIG. 4 illustrates an example of a snoop header data flow for automated multi-tier debug information collection, according to an embodiment.

The debug analyzer 150 may analyze raw debug information input from the data aggregator 145 and may perform calculations or other data manipulations to generate enhanced debug information such as a page/fragment size, a total number of ESI fragments on the page, total cache times at the CDN and application caching level, etc. The debug information output by the data aggregator 145 and the debug analyzer 150 may be forwarded to the presentation manager 155 for display to a user. In an example, the output may be displayed in a dashboard user interface, a client-side plugin application (e.g., as shown in FIG. 4), etc. The debug analyzer 150 may identify child fragment calls that are in a downstream tier using the origin response. In an example, the child fragment calls may be identified by parsing edge-side include (ESI) instructions of the origin response.

Debugging information may be extracted by the debug analyzer 150 from the child fragment calls based on debugging information returned using the snoop endpoint 135 or the snoop headers injected by the snoop header processor 140. In an example, the debugging information may include at least one of a content delivery network (CDN) edge time-to-live (TTL) value for a child page fragment, CDN cache control information for the child page fragment, tags for the child page fragment, a size for the child page fragment, a load time for the child page fragment, a status code for the child page fragment, or a fragment type for the child page fragment. In an example, a child fragment call of the child fragment calls may be transmitted to the snoop endpoint 135. A response may be received to the child fragment call from the snoop endpoint 135 and the debugging information may be extracted from the response to the child fragment call. In another example, a child fragment call of the child fragment calls may be modified by the snoop header processor 140 to include a snoop header and the modified child fragment call may be transmitted to a web server. A response may be received to the child fragment call from the web server and the debugging information may be extracted from the response to the child fragment call. In yet another example, the child fragment calls may be recursively transmitted to respective services. Responses may be received to the child fragment calls and the debugging information may be extracted from the response to the child fragment call.

Figure 5:
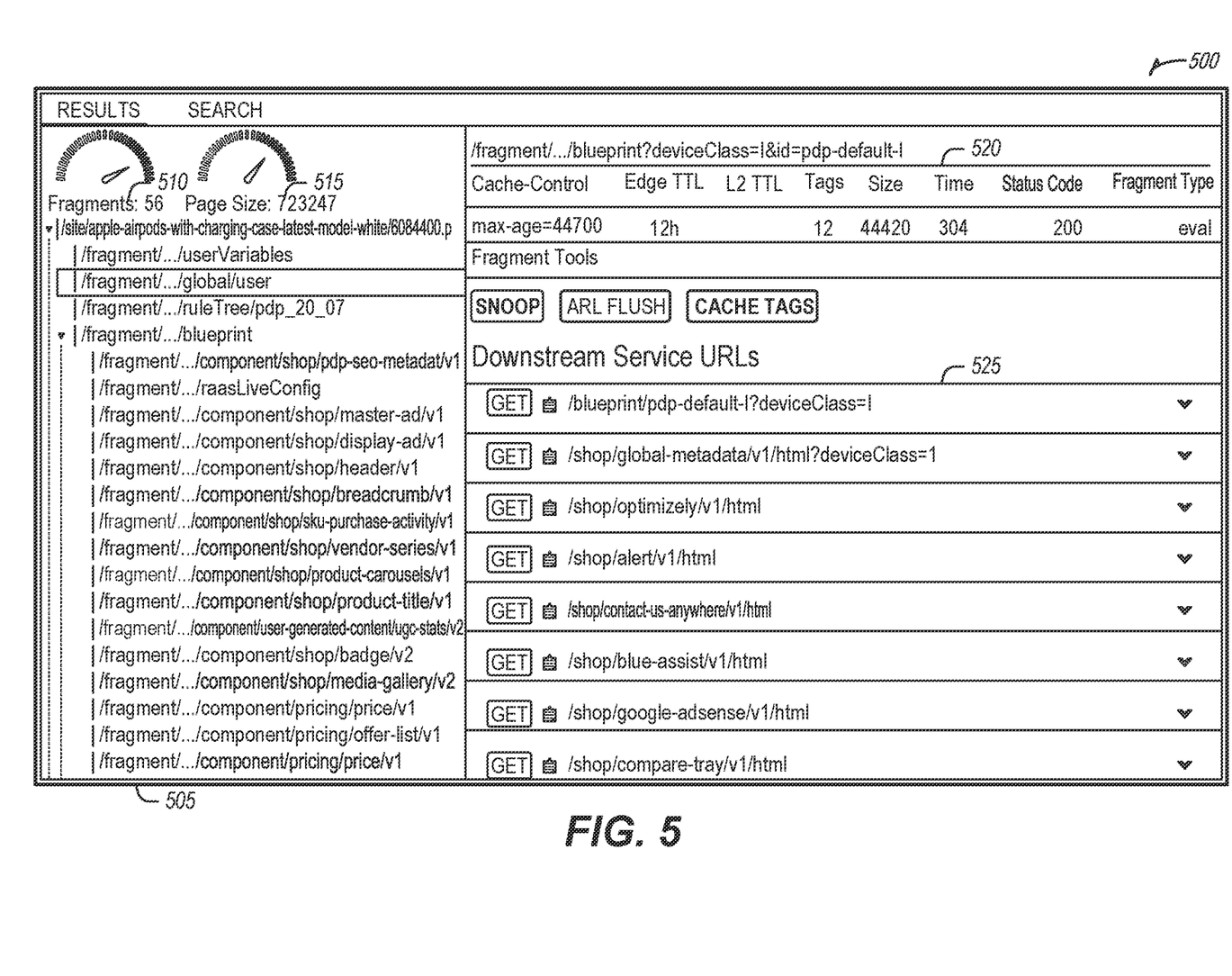
FIG. 5 illustrates an example of a user interface for display of debugging information for automated multi-tier debug information collection, according to an embodiment.

The debugging information from the child fragment calls may be aggregated by the data aggregator 145. The aggregated debugging information may be parsed for output by the presentation manager 155 on a display device, stored in memory, stored in a database or other data storage mechanism for later use, etc. In an example, the parsed aggregated debugging information may be transmitted to a client-side application plugin for a web page analysis tool or other application, or to an stand-alone application software program, for display on a display device of the client computing device. In another example, the parsed aggregated debugging information may be transmitted to a web-based user interface for display on a display device of the client computing device. For example, the debugging information may be displayed in a user interface as shown in FIG. 5, etc.

Figure 2:
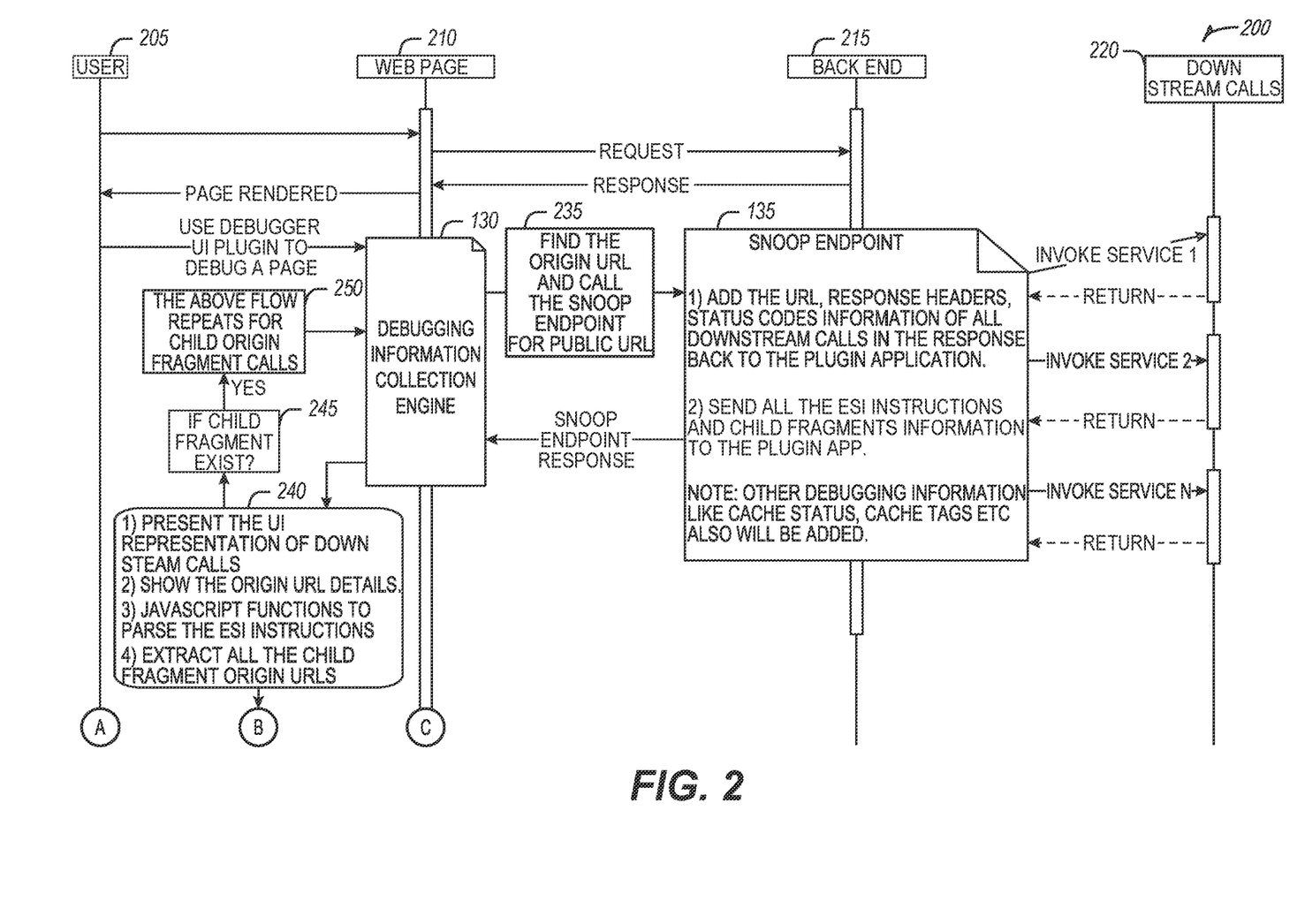
FIG. 2 illustrates a data flow diagram of an example of a snoop endpoint data flow for automated multi-tier debug information collection, according to an embodiment.

FIG. 2 illustrates a data flow diagram of an example of a snoop endpoint data flow 200 for automated multi-tier debug information collection, according to an embodiment. The snoop endpoint data flow 200 may provide features as described in FIG. 1.

The snoop endpoint data flow 200 illustrates an example of data flow for a snoop endpoint (e.g., the snoop endpoint 135 as described in FIG. 1, etc.) when a request for a debug of a web page is received by a snoop endpoint.

A user 205 makes a request for a web page 210 to the debugging information collection engine 130. For example, the request may be routed to the debugging information collection engine 130 rather than the usual host for receipt of the request for the web page 210.

The debugging information collection engine 130 obtains a public URL origin response of the web server to the backend 215 (e.g., a CDN, etc.) and parses ESI instructions to identify the child fragment origin calls (e.g., at operation 235). The debugging information collection engine 130 calls the snoop endpoint 135 of each child fragment by using the origin URL to extract the response and the debugging information of downstream calls 220 made during processing the request.

The debugging information collection engine 130 at the user 205 side parses the page and its subsequent child fragment instructions recursively and presents the debugging information (e.g., at operations 240, 245, and 250).

The debugging information collection engine 130 enables the user 205 to debug each downstream micro service call 230 (e.g., at operation 255) by calling the snoop endpoint 135 for each downstream service N 225. This recursive flow (e.g., at operation 260) continues so long as the snoop endpoint 135 is implemented in each nested micro service/system level.

The debugging information collection engine 130 enables the extracted debugging information to be pluggable with a variety of client side tools including plugins, simple web client applications, and the like.

A sample snoop response for a micro service is shown in Table 1.

TABLE 1

```
{
  "sample Json": "output",
  "debugStart": {
    "type": "start",
    "logicalName": "CDN Fragment Details",
    "id": "bc99c78a-cda0-44ca-9bae-acd12684118d",
```

TABLE 1-continued

```
    "fragmentUrl": "global/foo?a=1&b=2",
    "ttl": "1234",
    "serviceUrls": "[http://downstream-1.call.url, http://downstream-
       2.call.url,
http://downstream-n.call.url]",
    "responseUriHeaders": {
      "http://downstream-1.call.url": {
        "Cache-Control": "no-transform, max-age=1234",
        "Content-Type": "application/json;charset=UTF-8",
        "Date": "Wed, 15 Apr 2020 04:49:42 GMT",
        "ETag": "\"04e084c288c5b84b063c1d07f38b3b191\"",
        "Expires": "Thu, 16 Apr 2020 16:49:42 GMT",
        "Last-Modified": "Wed, 15 Apr 2020 04:49:42 GMT",
        "Server": "",
        "vary": "Origin",
        "Content-Length": "31",
        "Connection": "keep-alive"
      },
      "http://downstream-2.call.url": {
        "Cache-Control": "no-transform, max-age=129600",
        "Content-Encoding": "gzip",
        "Content-Type": "application/json;charset=UTF-8",
        "Date": "Wed, 15 Apr 2020 04:49:42 GMT",
        "ETag": "\"0a92a30aec67297ab4602ee83660a39dc-gzip\"",
        "Expires": "Thu, 16 Apr 2020 16:49:42 GMT",
        "Last-Modified": "Wed, 15 Apr 2020 04:49:42 GMT",
        "Server": "",
        "vary": "Origin,Accept-Encoding",
        "Content-Length": "2055",
        "Connection": "keep-alive"
      },
      "http://downstream-n.call.url": {
        "Content-Encoding": "gzip",
        "Content-Type": "text/html; charset=utf-8",
        "Date": "Wed, 15 Apr 2020 04:49:42 GMT",
        "ETag": "WA"2acd-cGg4P1yFfQRAL4nutITW3Q-gzip\"",
        "Server": "Apache",
        "Vary": "Accept,Accept-Encoding",
        "Content-Length": "3343",
        "Connection": "keep-alive",
        "method": "POST"
      }
    }
  },
  "debugEnd": {
    "type": "end",
    "id": "bc99c78a-cda0-44ca-9bae-acd126841f8d"
  }
}
```

Table 1 illustrates an example of a JavaScript Object Notation (JSON) response that shows debugging information is collected for downstream calls made for downstream-1, downstream-2, and downstream-n.

Figure 3:
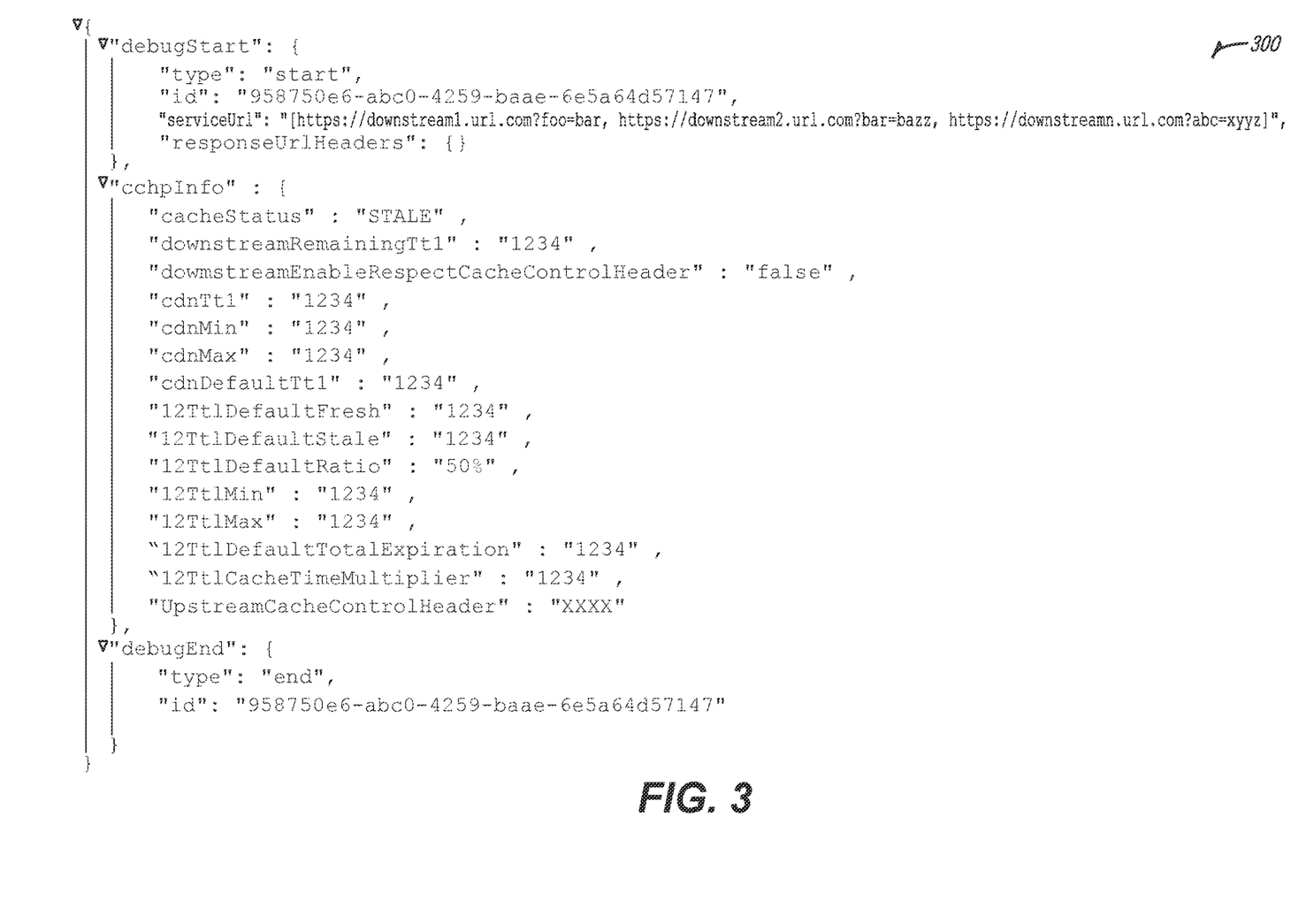
FIG. 3 illustrates an example of a sample snoop response of a micro service for automated multi-tier debug information collection, according to an embodiment.

FIG. 3 illustrates an example of a sample snoop response 300 of a micro service for automated multi-tier debug information collection, according to an embodiment. The snoop response 300 shows debugging caching information for downstream calls made for downstream-i (e.g., as shown in Table 1).

FIG. 4 illustrates an example of a snoop header data flow 400 for automated multi-tier debug information collection, according to an embodiment. The snoop header data flow 400 may provide features as described in FIGS. 1 and 2.

The snoop header data flow 400 illustrates an example of data flow for a snoop header (e.g., injected by the debugging information collection engine 130 as described in FIG. 1, etc.) when a request for a web page is received.

A user client computing device 405 makes a request for a web page 410 and the debugging and information collection engine 130 obtains a public URL origin response of a web server serving the web page 410 to a backend server 415 (e.g., a user profile data server, etc.) and parses ESI instructions (e.g., at operation 450) to identify (e.g., if existing at decision 455) all the child fragment origin calls (e.g., at operation 460).

The debugging and information collection engine 130 instructs the snoop header processor 140 to enable debug mode via the pragma: x-enable-debug-mode header for each child fragment origin URL (e.g., at operation 435).

The snoop header processor 140 detects the x-enable-debug-mode pragma header (e.g., at operation 445) and collects debugging information of downstream calls 420 made during processing of the request and attaches to the total response back to the user client computing device 405 (e.g., at operation 440).

The debugging and information collection engine 130 at the user client computing device 405 side parses the web page and its subsequent child fragment instructions recursively and presents the debugging information obtained from the snoop responses (e.g., at operations 450, 455, and 460).

The debugging and information collection engine 130 enables the user client computing device 405 to debug each nested downstream micro service or system 425 (e.g., at operation 465) by adding the pragma: x-enable-debug-mode header and calling its endpoints (e.g., at operation 470). This may continue recursively to each sub downstream call 430 for a nested downstream micro service or system 425 (e.g., at operations 475 and 480) while the downstream micro service or system 425 implements the snoop header processor 140. The debugging information returned is presented back to the user client computing device 405 (e.g., at operation 485).

The above example of sub level flow for the downstream micro service or system 425 extracts the debugging information request/response headers, status of the calls, caching information, etc. for presentation to the user client computing device 405. The extracted debugging information may be pluggable with a variety of client side tools including plugins, simple web client applications, and the like.

FIG. 5 illustrates an example of a user interface 500 for display of debugging information for automated multi-tier debug information collection, according to an embodiment. The user interface 500 may provide features as described in FIGS. 1 to 4.

It may be understood that the user interface 500 may be implemented using a variety of user interface display techniques. In an example, the user interface 500 may be a client-side plugin application. In another example, the user interface 500 may be a web-based debugging portal. In yet another example, the user interface 500 may be a plug-in for a debugging application. The user interface 500 displays collected debugging information.

CDN fragments that were parsed (e.g., as described in FIGS. 2 and 3, etc.) are displayed in a pane of the user interface 500 as a tree 505. A summary of total CDN fragments 510 for a web page along with the total size of the page 515 are displayed in the user interface 500.

Caching information and statistics of service calls 520 are displayed and may include edge time to live (TTL), level two cache (L2) TTL, tags, time taken to complete a request for the web page, status of the response, etc.

Downstream calls 525 made for a sample fragment (e.g., fragment/ . . . /blueprint) are displayed in the user interface 500. A snoop (e.g., as described in FIGS. 2 and 3) may be recursive for each downstream call and similar information may be obtained and displayed for each child fragment.

Figure 6:
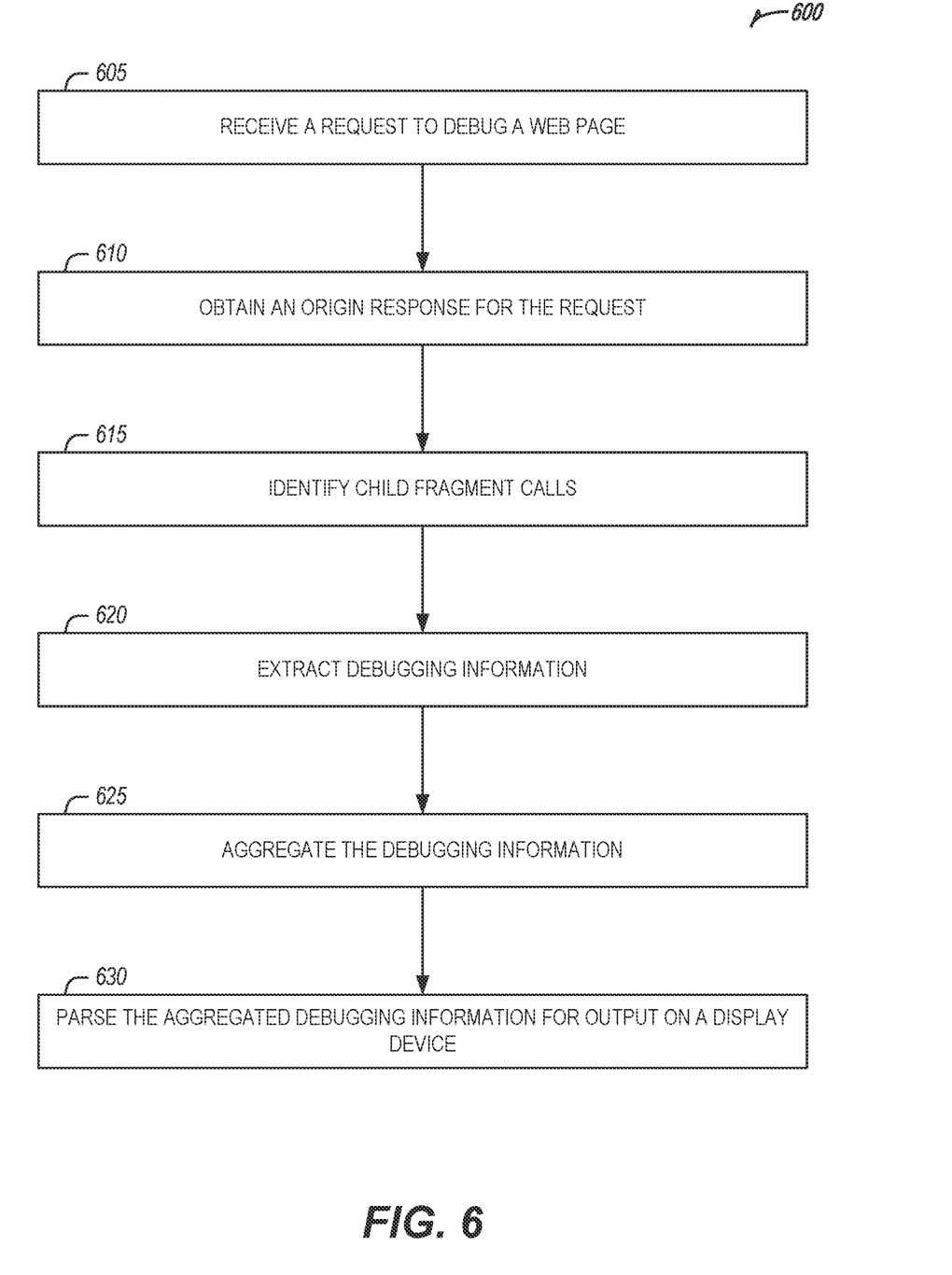
FIG. 6 illustrates an example of a method for automated multi-tier debug information collection, according to an embodiment.

FIG. 6 illustrates an example of a method 600 for automated multi-tier debug information collection, according to an embodiment. The method 600 may provide features as described in FIGS. 1 to 5.

A request to debug a web page may be received for a web page from a client computing device (e.g., at operation 605).

An origin response may be obtained (e.g., by the debug analyzer 150 as described in FIG. 1, etc.) for the request from a content server (e.g., at operation 610). In an example, the origin response may include zero to many universal resource locators for web page fragments on a web server.

Child fragment calls may be identified (e.g., by the debug analyzer 150 as described in FIG. 1, etc.) that are in a downstream tier using the origin response (e.g., at operation 615). In an example, the child fragment calls may be identified by parsing edge-side include instructions of the origin response.

Debugging information may be extracted (e.g., by the debug analyzer 150 from debugging information collected by the snoop endpoint 135 and using the snoop header processor 140 as described in FIG. 1, etc.) from the child fragment calls (e.g., at operation 620). In an example, the debugging information includes at least one of a content delivery network (CDN) edge time-to-live (TTL) value for a child page fragment. CDN cache control information for the child page fragment, tags for the child page fragment, a size for the child page fragment, a load time for the child page fragment, a status code for the child page fragment, or a fragment type for the child page fragment. In an example, a child fragment call of the child fragment calls may be transmitted to a snoop endpoint. A response may be received to the child fragment call from the snoop endpoint and the debugging information may be extracted from the response to the child fragment call. In another example, a child fragment call of the child fragment calls may be modified to include a snoop header and the modified child fragment call may be transmitted to a web server. A response may be received to the child fragment call from the web server and the debugging information may be extracted from the response to the child fragment call. In yet another example, the child fragment calls may be recursively transmitted to respective services. Responses may be received to the child fragment calls and the debugging information may be extracted from the response to the child fragment call.

The debugging information from the child fragment calls may be aggregated (e.g., by the data aggregator 145 as described in FIG. 1, etc.) (e.g., at operation 625). The aggregated debugging information may be parsed for output (e.g., by the presentation manager 155 as described in FIG. 1, etc.) on a display device (e.g., at operation 630). In an example, the parsed aggregated debugging information may be transmitted to a client-side application plugin for display on a display device of the client computing device. In another example, the parsed aggregated debugging information may be transmitted to a web-based user interface for display on a display device of the client computing device.

Figure 7:
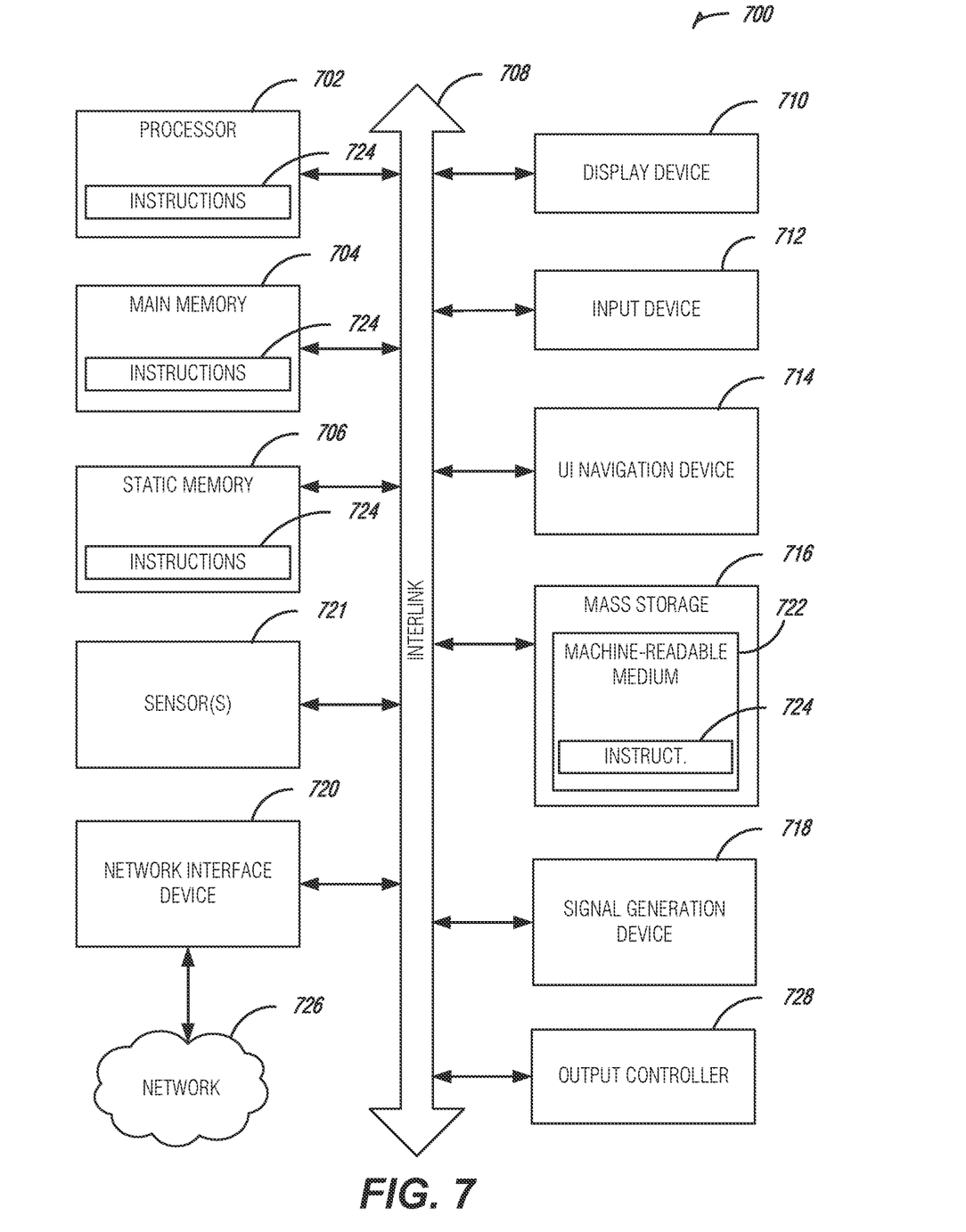
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensors. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.). IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for automated multi-tier debug information collection comprising:
   at least one processor; and
   memory including instructions that, when executed by the at least one processor, cause the at least one processor to perform operations to:
   receive a request to debug a web page submitted by a client computing device;
   obtain an origin response for the request from a content server;
   identify child fragment calls that are for a downstream tier using the origin response, wherein the child fragment calls are for content fragments of the web page to be retrieved from web delivery architecture tiers that are downstream from the content server;
   extract debugging information from the child fragment calls;
   aggregate the debugging information from the child fragment calls; and
   parse the aggregated debugging information to store the parsed aggregated debugging information for display on the client computing device.

2. The system of claim 1, wherein the origin response includes a universal resource locator for the web page of a web server.

3. The system of claim 1, wherein the instructions to identify the child fragment calls further cause the at least one processor to perform operations to parse edge-side include (ESI) instructions of the origin response to identify the child fragment calls.

4. The system of claim 1, the memory further comprising instructions that, when executed by the at least one processor, cause the at least one processor to perform operations to:
   transmit a child fragment call of the child fragment calls to a snoop endpoint; and
   receive a response to the child fragment call from the snoop endpoint, wherein the debugging information is extracted from the response to the child fragment call.

5. The system of claim 1, the memory further comprising instructions that, when executed by the at least one processor, cause the at least one processor to perform operations to:
   modify a child fragment call of the child fragment calls to include a snoop header;
   transmit the modified child fragment call to a web server in the downstream tier; and
   receive a response to the child fragment call from the web server, wherein the debugging information is extracted from the response to the child fragment call.

6. The system of claim 1, the memory further comprising instructions that, when executed by the at least one processor, cause the at least one processor to perform operations to:
   recursively transmit the child fragment calls to respective services; and
   receive responses to the child fragment calls from the respective services, wherein the debugging information is extracted from the responses to the child fragment calla.

7. The system of claim 1, wherein the debugging information includes at least one of a content delivery network (CDN) edge time-to-live (TTL) value for a child page fragment of the web page, CDN cache control information for the child page fragment, tags for the child page fragment, a size for the child page fragment, a load time for the child page fragment, a status code for the child page fragment, or a fragment type for the child page fragment.

8. The system of claim 1, the memory further comprising instructions that, when executed by the at least one processor, cause the at least one processor to perform operations to:

transmit the parsed aggregated debugging information to a client-side application plugin for display on a display device of the client computing device.

9. The system of claim 1, the memory further comprising instructions that, when executed by the at least one processor, cause the at least one processor to perform operations to:
transmit the parsed aggregated debugging information to a web-based user interface for display on a display device of the client computing device.

10. At least one non-transitory machine-readable medium including instructions for automated multi-tier debug information collection that, when executed by at least one processor, cause the at least one processor to perform operations to:
receive a request to debug a web page submitted by a client computing device;
obtain an origin response for the request from a content server;
identify child fragment calls that are for a downstream tier using the origin responses, wherein the child fragment calls are for content fragments of the web page to be retrieved from web delivery architecture tiers that are downstream from the content server;
extract debugging information from the child fragment calls;
aggregate the debugging information from the child fragment calls; and
parse the aggregated debugging information to store the parsed aggregated debugging information for display on the client computing device.

11. The at least one non-transitory machine-readable medium of claim 10, wherein the origin response includes a universal resource locator for the web page of a web server.

12. The at least one non-transitory machine-readable medium of claim 10, wherein the instructions to identify the child fragment calls further cause the at least one processor to perform operations to parse edge-side include (ESI) instructions of the origin response to identify the child fragment calls.

13. The at least one non-transitory machine-readable medium of claim 10, further comprising instructions that, when executed by the at least one processor, cause the at least one processor to perform operations to:
transmit a child fragment call of the child fragment calls to a snoop endpoint; and
receive a response to the child fragment call from the snoop endpoint, wherein the debugging information is extracted from the response to the child fragment call.

14. The at least one non-transitory machine-readable medium of claim 10, further comprising instructions that, when executed by the at least one processor, cause the at least one processor to perform operations to:
modify a child fragment call of the child fragment calls to include a snoop header;
transmit the modified child fragment call to a web server in the downstream tier; and
receive a response to the child fragment call from the web server, wherein the debugging information is extracted from the response to the child fragment call.

15. The at least one non-transitory machine-readable medium of claim 10, further comprising instructions that, when executed by the at least one processor, cause the at least one processor to perform operations to:
recursively transmit the child fragment calls to respective services; and
receive responses to the child fragment calls from the respective services, wherein the debugging information is extracted from the responses to the child fragment calla.

16. The at least one non-transitory machine-readable medium of claim 10, wherein the debugging information includes at least one of a content delivery network (CDN) edge time-to-live (TTL) value for a child page fragment of the web page, CDN cache control information for the child page fragment, tags for the child page fragment, a size for the child page fragment, a load time for the child page fragment, a status code for the child page fragment, or a fragment type for the child page fragment.

17. The at least one non-transitory machine-readable medium of claim 10, further comprising instructions that, when executed by the at least one processor, cause the at least one processor to perform operations to:
transmit the parsed aggregated debugging information to a client-side application plugin for display on a display device of the client computing device.

18. The at least one non-transitory machine-readable medium of claim 10, further comprising instructions that, when executed by the at least one processor, cause the at least one processor to perform operations to:
transmit the parsed aggregated debugging information to a web-based user interface for display on a display device of the client computing device.

19. A method for automated multi-tier debug information collection comprising:
receiving a request to debug a web page submitted by a client computing device;
obtaining an origin response for the request from a content server;
identifying child fragment calls that are for a downstream tier using the origin responses, wherein the child fragment calls are for content fragments of the web page to be retrieved from web delivery architecture tiers that are downstream from the content server;
extracting debugging information from the child fragment calls;
aggregating the debugging information from the child fragment calls; and
parsing the aggregated debugging information to store the parsed aggregated debugging information for display on the client computing device.

20. The method of claim 19, wherein the origin response includes a universal resource locator for the web page of a web server.

21. The method of claim 19, wherein identifying the child fragment calls further comprises parsing edge-side include (ESI) instructions of the origin response to identify the child fragment calls.

22. The method of claim 19, further comprising:
transmitting a child fragment call of the child fragment calls to a snoop endpoint; and
receiving a response to the child fragment call from the snoop endpoint, wherein the debugging information is extracted from the response to the child fragment call.

23. The method of claim 19, further comprising:
modifying a child fragment call of the child fragment calls to include a snoop header;
transmitting the modified child fragment call to a web server in the downstream tier; and
receiving a response to the child fragment call from the web server, wherein the debugging information is extracted from the response to the child fragment call.

24. The method of claim 19, further comprising:
recursively transmitting the child fragment calls to respective services; and
receiving responses to the child fragment calls from the respective services, wherein the debugging information is extracted from the responses to the child fragment calla.

25. The method of claim 19, wherein the debugging information includes at least one of a content delivery network (CDN) edge time-to-live (TTL) value for a child page fragment of the web page, CDN cache control information for the child page fragment, tags for the child page fragment, a size for the child page fragment, a load time for the child page fragment, a status code for the child page fragment, or a fragment type for the child page fragment.

26. The method of claim 19, further comprising:
transmitting the parsed aggregated debugging information to a client-side application plugin for display on a display device of the client computing device.

27. The method of claim 19, further comprising:
transmitting the parsed aggregated debugging information to a web-based user interface for display on a display device of the client computing device.

\* \* \* \* \*